United States Patent
Heo et al.

(10) Patent No.: US 10,366,673 B2
(45) Date of Patent: Jul. 30, 2019

(54) DISPLAY DEVICE AND IMAGE PROCESSING METHOD THEREOF

(71) Applicant: LG Display Co., Ltd., Seoul (KR)

(72) Inventors: Cheon Heo, Paju-si (KR); KyungJoon Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 9 days.

(21) Appl. No.: 15/802,218

(22) Filed: Nov. 2, 2017

(65) Prior Publication Data

US 2018/0151153 A1    May 31, 2018

(30) Foreign Application Priority Data

Nov. 30, 2016 (KR) .......................... 10-2016-0162044

(51) Int. Cl.
| | |
|---|---|
| G09G 5/02 | (2006.01) |
| H04N 1/60 | (2006.01) |
| G09G 5/06 | (2006.01) |
| H04N 9/64 | (2006.01) |

(52) U.S. Cl.
CPC ............. *G09G 5/02* (2013.01); *H04N 1/6002* (2013.01); *H04N 1/6008* (2013.01); *H04N 1/6016* (2013.01); *G09G 2310/08* (2013.01); *G09G 2320/0233* (2013.01)

(58) Field of Classification Search
USPC ........................................................ 345/604
See application file for complete search history.

(56) References Cited

U.S. PATENT DOCUMENTS

| | | | |
|---|---|---|---|
| 2005/0083344 A1* | 4/2005 | Higgins | ................. G09G 5/003 345/600 |
| 2009/0066731 A1 | 3/2009 | Kim et al. | |
| 2009/0263016 A1* | 10/2009 | Kuo | ...................... G06T 7/0002 382/167 |
| 2010/0190362 A1* | 7/2010 | Wallrafen | ............ H01R 13/112 439/81 |
| 2011/0090362 A1* | 4/2011 | Yanagita | .............. H04N 1/6027 348/222.1 |
| 2012/0274798 A1* | 11/2012 | Takahashi | .............. H04N 9/045 348/222.1 |
| 2015/0054864 A1 | 2/2015 | Choi | |
| 2017/0278474 A1* | 9/2017 | Nakanishi | ................. B60R 1/00 |
| 2018/0115705 A1* | 4/2018 | Olsson | ...................... G06T 5/50 |

FOREIGN PATENT DOCUMENTS

| | | |
|---|---|---|
| KR | 10-2009-0025896 A | 3/2009 |
| KR | 10-2015-0022235 A | 3/2015 |

\* cited by examiner

*Primary Examiner* — Wesner Sajous
(74) *Attorney, Agent, or Firm* — Fenwick & West LLP

(57) ABSTRACT

Provided are a display device and an image processing method thereof. In an embodiment, the display device includes a display panel including a plurality of pixels formed of red, green, blue, and white sub pixels, and an image processing unit for converting a three-color input image supplied to the red, green, blue, and white sub pixels into four-color image data and outputting an output image by applying a final gain calculated using a frame gain, a pixel gain, and a block gain of the pixels. The display device also includes a timing controller for outputting the output image from the image processing unit to the display panel. The block gain may be calculated using scaled versions of luminance values determined by converting a luminance of the three-color input image and position information of the pixels.

23 Claims, 6 Drawing Sheets

DISPLAY DEVICE AND IMAGE PROCESSING METHOD THEREOF

CROSS-REFERENCE TO RELATED APPLICATION

This application claims priority under 35 U.S.C. § 119(a) of Republic of Korea Patent Application No. 10-2016-0162044, filed on Nov. 30, 2016, which is incorporated herein by reference in its entirety.

BACKGROUND

Technical Field

The present disclosure relates to a display device, and more particularly, to a display device which may improve a sharpness of chromatic colors in a RGBW type display device and an image processing method thereof.

Description of the Related Art

As the information-oriented age has come, display devices are rapidly spreading. Due to characteristics of the display device such as having a light weight, a thin thickness, or low power consumption, the display device is applied to a wide range of applications including a mobile phone, a PDA, a smart phone, a TV, a monitor, and a notebook computer.

The display device includes a liquid crystal display device LCD, a plasma display panel device PDP, a field emission display device FED, or an organic light emitting display device OLED.

The display device includes a plurality of pixels defined by a plurality of data lines and a plurality of gate lines.

Each pixel of the display device includes red R, green G, and blue B sub pixels and the display device mixes red R, green G, and blue B sub pixel light to implement one color image. However, in the display device which implements one color image by mixing light of the red R, green G, and blue B sub pixels, color filters disposed in each of the red R, green G, and blue B sub pixels transmit approximately one third of the applied light. Therefore, there is a drawback in that light efficiency is lowered as a whole.

In order to compensate the drawback, a RGBW type display device which further includes a white sub pixel W in addition to the red R, the green G, and the blue B sub pixels has been suggested.

The RGBW type display device generates three-color amplifying data by multiplying a set gain value and red, green, and blue data, and then extracts white data having the lowest gray scale level from the three-color amplifying data. The RGBW type display device subtracts white data extracted from the three-color amplifying data to generate four-color data.

The RGBW type display device generates four-color data and then applies a pixel gain in consideration of a saturation of the entire frame. Next, a final gain is calculated using a pixel gain and a frame gain and then a color contrast ratio is calculated by a difference between the final gain of each pixel and a total average of the final gain of the entire frame. As described above, in the general RGBW type display device, the color contrast ratio is collectively calculated for the entire frame. That is, in the RGBW type display device, the same pixel gain may be applied to the same input data.

However, in the RGBW type display device, luminance increase of a chromatic color is more than luminance increase of an achromatic color. Therefore, when the same pixel gain is applied, the chromatic color may be sensed to be relatively darker, so that the sharpness of the chromatic colors is reduced.

SUMMARY

An aspect of the present disclosure is to provide a display device that improves luminance of an area of an achromatic area adjacent to a chromatic area to improve sharpness of the chromatic colors. Another aspect of the present disclosure is to provide an image processing method thereof.

According to an embodiment of the present disclosure, there is provided a display device. The display device includes a display panel including a plurality of pixels formed of red, green, blue, and white sub pixels. The display device further includes an image processing unit that converts a three-color input image supplied to the red, green, blue, and white sub pixels into four-color image data and outputs an output image by applying a final gain calculated using a frame gain, a pixel gain, and a block gain of pixels of the three-color input image. The display device further includes a timing controller that outputs the output image from the image processing unit to the display panel. The block gain is calculated by using scaled versions of luminance values of the three-color input image and position information of the pixels of the three-color input image.

In one or more embodiments, the image processing unit processes a first frame image and a second frame image of the three-color input image to output a first output frame image and a second output frame image and calculates the pixel gain and the block gain using the first output frame image.

In one or more embodiments, the block gain is calculated using a pixel weight and a block interpolation value. The pixel weight is calculated by multiplying the scaled versions of luminance values and scaled versions of saturation values. The scaled versions of saturation values is determined by converting a saturation of the three-color input image. The block interpolation value is determined by dividing the first output frame image into a plurality of blocks to reflect position information of the plurality of pixels and interpolating the plurality of blocks with an intermediate value of a plurality of block values.

In one or more embodiments, the image processing unit further includes a RGBW converting unit for converting the first frame image and the second frame image into a four-color first frame image and a four-color second frame image, respectively, a luminance converting unit for converting luminance of the first frame image to determine the scaled versions of luminance values, a saturation converting unit converting saturation of the first frame image to determine the scaled versions of saturation values, a frame gain calculating unit for calculating a first frame gain and a second frame gain of the pixels of the three-color input image for the first frame image and the second frame image, respectively, a pixel gain calculating unit for calculating a first pixel gain and a second pixel gain of the pixels of the three-color input image for the first frame image and the second frame image, respectively, and a block gain calculating unit for calculating a block gain using the scaled versions of luminance values and the scaled versions of saturation values. The image processing unit further includes a final gain calculating unit for calculating a first final gain of the first frame image using the first frame gain and the first pixel gain and calculating a second final gain of the second frame image using the second frame gain, the second pixel gain, and the block gain. The image processing unit further includes a color contrast ratio calculating unit for calculating a color contrast ratio using the first final gain.

In one or more embodiments, the pixel gain calculating unit calculates the first pixel gain of the first frame image according to the scaled versions of saturation values. A first pixel gain value of 0 corresponds to first pixels of a chromatic area of the first frame image, and a second pixel gain value between 0.1 and 1 corresponds to second pixels of an achromatic area of the first frame image.

In one or more embodiments, the color contrast ratio calculating unit calculates the color contrast ratio by calculating an average of first final gains of the of pixels of the three-color input image, a first difference between a first final gain of a first pixel of a chromatic area of the first frame image and the average of first final gains, a second difference between a second final gain of a second pixel of an achromatic area of the first frame image and the average of first final gains, and a sum of the first difference and the second difference.

In one or more embodiments, the pixel gain calculating unit calculates the second pixel gain for the second frame image using the color contrast ratio and the first pixel gain.

In one or more embodiments, the block gain calculating unit includes a pixel weight calculating unit for calculating the pixel weight using the scaled versions of luminance values and the scaled versions of saturation values, a block interpolation value calculating unit for dividing the first output frame image into the plurality of blocks and calculating the block interpolation value by interpolating the divided first output frame image, and a block gain output unit for outputting the block gain by dividing the pixel weight by the block interpolation value.

In one or more embodiments, the block interpolation value calculating unit (i) calculates a first block average of a chromatic area of the first frame image and a second block average of an achromatic area of the first frame image and (ii) interpolates a boundary area of the chromatic area and the achromatic area with an intermediate value to calculate the block interpolation value. The intermediate value is calculated using an average of the first block average and the second block average.

In one or more embodiments, initial values of the scaled versions of luminance values and the scaled versions of saturation values are set to be intermediate values in a range of weights.

In one or more embodiments, the image processing unit lowers gains of the pixels of the three-color input image representing a boundary of an achromatic color area of the three-color input image and a chromatic color area of the three-color input image.

According to embodiment of the present disclosure, there is provided an image processing method including determining gain values of pixels of an input image, where the gain values include first gain values for a first portion of the input image having a first average saturation value and second gain values for a second portion of the input image having a second average saturation value. The method further includes determining a color contrast ratio by combining the first gain values and the second gain values. The method further includes modifying a subset of the gain values corresponding to pixels at a boundary between the first portion and the second portion. The method further includes generating an output image by processing another input image subsequent to the input image using the color contrast ratio and the modified subset of gain values.

In one or more embodiments, the method further includes determining an average of the gain values, determining a first difference between one of the first gain values and the average of the gain values, and determining a second difference between one of the second gain values and the average of the gain values. The color contrast ratio is determined by adding the first difference and the second difference.

In one or more embodiments, modifying the subset of the gain values corresponding to pixels at the boundary between the first portion and the second portion includes performing interpolation on the subset of gain values using the first gain values and the second gain values such that luminance values of pixels of the output image corresponding to the boundary are less than other luminance values of other pixels of the output image.

In one or more embodiments, the method further includes determining a first image including scaled versions of luminance values of the input image, determining a second image including scaled versions of saturation values of the input image, determining pixel weights of the pixels of the input image by multiplying the first image with the second image, determining block interpolation values by performing the interpolation on the subset of gain values, and determining block gain values by dividing the pixel weights by the block interpolation values, where the gain values include the block gain values.

In one or more embodiments, the scaled versions of luminance values and the scaled versions of saturation values do not include zero values.

In one or more embodiments, the first portion of the input image corresponds to a chromatic area and the second portion of the input image corresponds to an achromatic area, the first average saturation value less than the second average saturation value.

According to embodiment of the present disclosure, there is provided display device including a display panel having a plurality of red, green, blue, and white sub pixels, and an image processing unit. The image processing unit is configured to determine gain values of pixels of an input image. The gain values includes first gain values for a first portion of the input image having a first average saturation value and second gain values for a second portion of the input image having a second average saturation value. The image processing unit is further configured to determine a color contrast ratio by combining the first gain values and second gain values. The image processing unit is further configured to modify a subset of the gain values corresponding to pixels at a boundary between the first portion and the second portion. The image processing unit is further configured to generate an output image by processing another input image subsequent to the input image using the color contrast ratio and the modified subset of gain values for display on the display panel.

In one or more embodiments, the image processing unit is further configured to determine an average of the gain values, determine a first difference between one of the first gain values and the average of the gain values, and determine a second difference between one of the second gain values and the average of the gain values. The color contrast ratio is determined by adding the first difference and the second difference.

In one or more embodiments, the subset of the gain values corresponding to pixels at the boundary between the first portion and the second portion is modified by performing interpolation on the subset of gain values using the first gain values and the second gain values such that luminance values of pixels of the output image corresponding to the boundary are less than other luminance values of other pixels of the output image.

In one or more embodiments, the image processing unit is further configured to determine a first image including scaled versions of luminance values of the input image, determine a second image including scaled versions of saturation values of the input image, determine pixel weights of the pixels of the input image by multiplying the first image with the second image;determine block interpolation values by performing the interpolation on the subset of gain values, and determine block gain values by dividing the pixel weights by the block interpolation values. The gain values include the block gain values.

In one or more embodiments, the scaled versions of luminance values and the scaled versions of saturation values do not include zero values.

In one or more embodiments, the first portion of the input image corresponds to a chromatic area and the second portion of the input image corresponds to an achromatic area. The first average saturation value may be less than the second average saturation value.

Other detailed matters of the embodiments are included in the detailed description and the drawings.

According to the present disclosure, a luminance of an area of an achromatic area adjacent to a chromatic area is processed to be darker than that of an area which is not adjacent to the chromatic area, thereby improving a sharpness of chromatic colors of images displayed by a display device.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
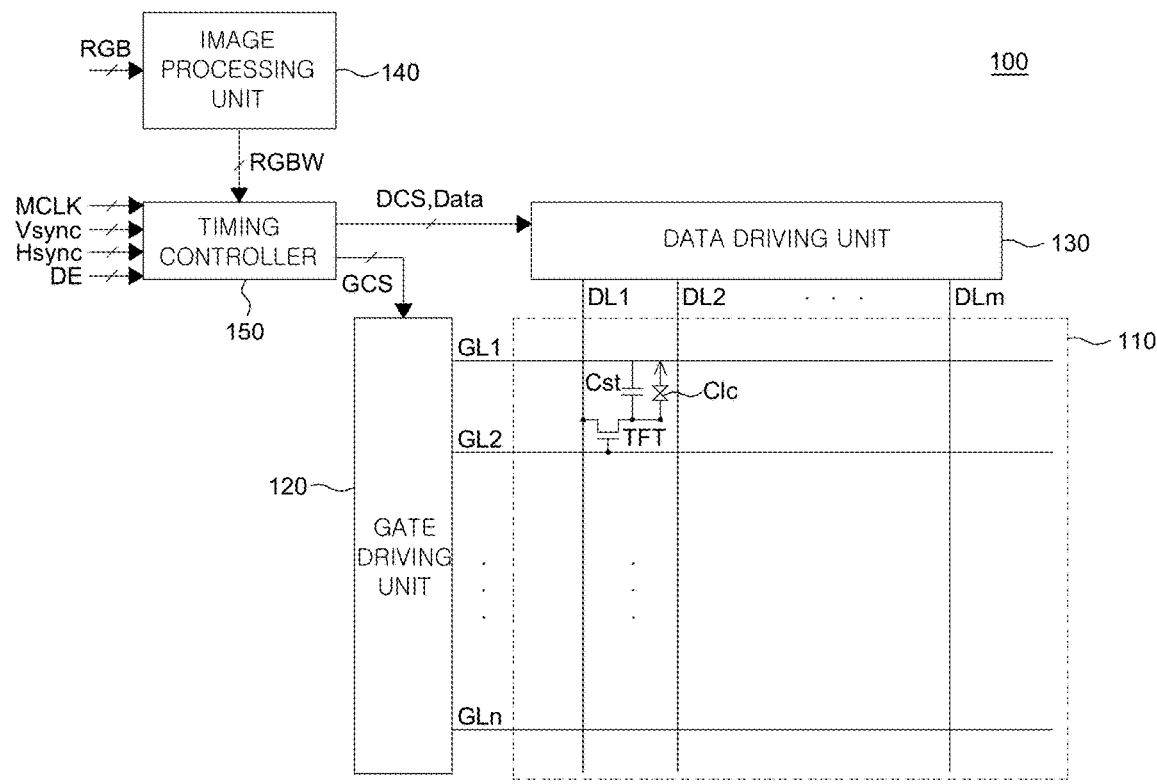
FIG. 1 is a block diagram schematically illustrating a display device according to an embodiment of the present disclosure.

Advantages and characteristics of the present disclosure and a method of achieving the advantages and characteristics will be clear by referring to embodiments described below in detail together with the accompanying drawings. However, the present disclosure is not limited to embodiment disclosed herein but will be implemented in various forms. The embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification and drawings. Further, in the following description of the present disclosure, a detailed explanation of known related technologies may be omitted to avoid unnecessarily obscuring the subject matter of the present disclosure. The terms such as "including" and "having" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" other element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification and drawings.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways as understood by those skilled in the art, and the embodiments can also be carried out independently of or in association with each other.

Hereinafter, various embodiments of the present disclosure will be described in detail with reference to accompanying drawings.

FIG. 1 is a block diagram illustrating a display device according to an embodiment of the present disclosure.

Referring to FIG. 1, a display device 100 according to an embodiment of the present disclosure includes a display panel 110, a gate driving unit 120, a data driving unit 130, an image processing unit 140, and a timing controller 150. In FIG. 1, even though the image processing unit 140 and the timing controller 150 are described as separate components, the image processing unit 140 may be included in the timing controller 150 or the image processing unit 140 and the timing controller 150 may be configured to be integrated.

In the display panel 110, m data lines DL1, DL2, ..., and DLm are disposed in a first direction and n gate lines GL1, GL2, ..., and GLn are disposed in a second direction that intersects the first direction. Further, in the display panel 110, a plurality of pixels may be located at intersections of the m data lines DL1, DL2, ..., and DLm and n gate lines GL1, GL2, ..., and GLn.

A pixel may include red R, green G, blue B, and white W sub pixels, as well as a thin film transistor TFT, a storage capacitor Cst, a liquid crystal capacitor Clc, a pixel electrode, and a common electrode.

The thin film transistor TFT is turned on according to a gate signal supplied from the gate lines GL1, GL2, ..., and GLn to supply a data signal Data supplied from the data lines DL1, DL2, ..., and DLm to the corresponding pixel.

The storage capacitor Cst functions to maintain a voltage of the corresponding pixel for a predetermined period.

The pixel may include liquid crystal molecules which are driven by an electric field between a pixel electrode to which the data signal Data is supplied through the thin film transistor TFT and a common electrode to which a common voltage is applied. In an embodiment, the pixel is configured by the common electrode and the pixel electrode connected to the thin film transistor TFT so that it may be equivalently represented as a liquid crystal capacitor Clc. The pixel includes the storage capacitor Cst to maintain a data signal charged in the liquid crystal capacitor Clc, e.g., until a next data signal is charged.

In the display panel 110, red R, green G, blue B, and white W sub pixels are formed in the first direction of the sub pixel. The sub pixels may be formed in a repeating pattern in a given direction. In the red R, green G, and blue B sub pixels (e.g., excluding the white W sub pixel), a color filter corresponding to each color may be disposed, e.g., a red color filter, green color filter, and blue color filter. Further, the red R, green G, blue B, and white W sub pixels may form a stripe structure with the same size ratio or different size ratios. In an embodiment, the red R, green G, blue B, and white W sub pixels may be disposed in an up, down, left, and right configuration, that is, disposed in 2×2 matrix.

Further, the display device 100 according to an embodiment of the present disclosure may further include a backlight and a backlight driving unit. In some embodiments of the present disclosure, a liquid crystal display panel is described as an example of the display panel 110. However, the display panel 110 is not limited thereto and the display panel 110 may be an organic light emitting display panel or another type of display panel.

The gate driving unit 120 sequentially applies a "gate on voltage" to n gate lines GL1, GL2, ..., and GLn in response to a gate control signal GCS input from the timing controller 150. The gate driving unit 120 may include a shift register that sequentially generates the "gate on voltage."

The data driving unit 130 receives a data control signal DCS from the timing controller 150 to convert four-color data (e.g., aligned in the timing controller 150) into an image signal that is an analog signal. The data driving unit 130 supplies the image signal to the m data lines DL1, DL2, ..., and DLm.

When an input image having red R, green G, and blue B colors is input from outside the display device 100, the image processing unit 140 may convert the input image into four-color image data R'G'B'W'. The image processing unit 140 may calculate a frame gain and a pixel gain of each of the red, green, blue, and white sub pixels to which the four-color image data R'G'B'W' is input. The image processing unit 140 calculates a "final gain" using a frame gain and a pixel gain and outputs an output image to which the final gain is reflected to the timing controller 150. Note that the term "final gain" as used herein does not necessarily indicate that the "final gain" is the final or last gain calculated by the image processing unit 140. Moreover, the image processing unit 140 may calculate different "final gains" for multiple frames of input images. In some embodiments, when the final gain is calculated, the image processing unit 140 calculates a block gain in which the distance between pixels, a luminance weight, and a saturation weight for the input image are considered and reflects the block gain to calculate the final gain. Therefore, a sharpness of chromatic colors displayed by the display device 100 may be improved as compared with the related art. A detailed configuration of the image processing unit 140 will be described with reference to FIG. 2.

The timing controller 150 receives the four-color image data RGBW from the image data processing unit 140 to supply the four-color image data RGBW to the data driving unit 130. Further, the timing controller 150 generates a gate control signal GCS and a data control signal DCS that control an operation timing of the gate driving unit 120 and the data driving unit 130, respectively, for example, using a main clock MCLK, a data enable signal DE, a vertical synchronizing signal Vsync, and a horizontal synchronizing signal Hsync, which may be input from outside the display device 100.

Figure 2:
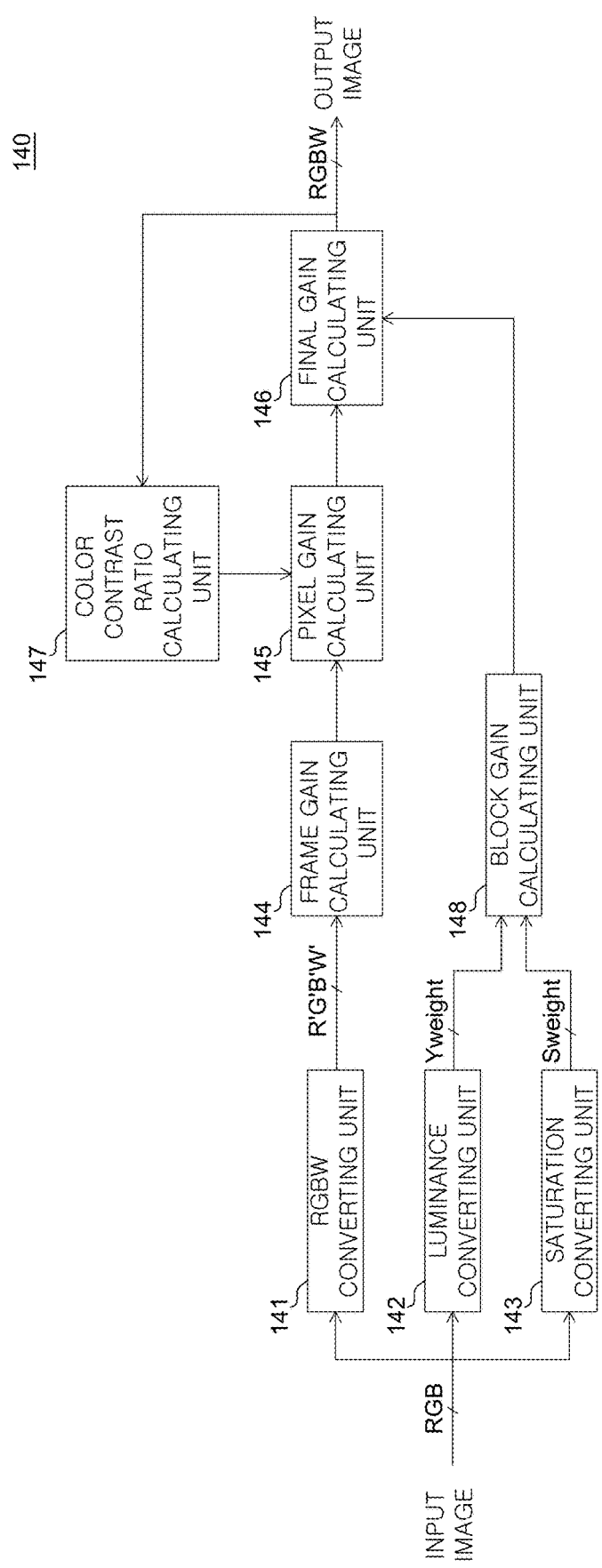
FIG. 2 is a block diagram schematically illustrating a configuration of an image processing unit of the display device shown in FIG. 1 according to an embodiment.
Figure 3:
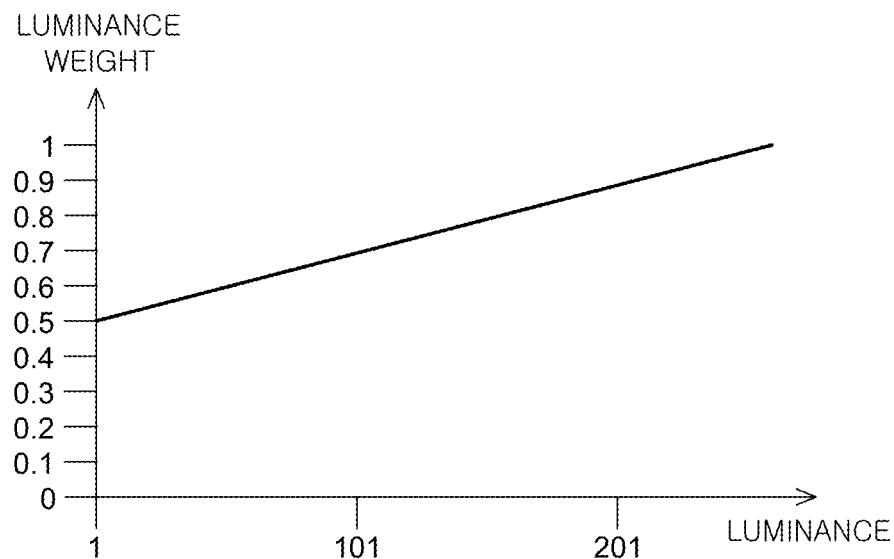
FIG. 3 is a graph illustrating a luminance and a luminance weight to be applied to a pixel for processing of an input image by a luminance converting unit of the image processing unit shown in FIG. 2 according to an embodiment.
Figure 4:
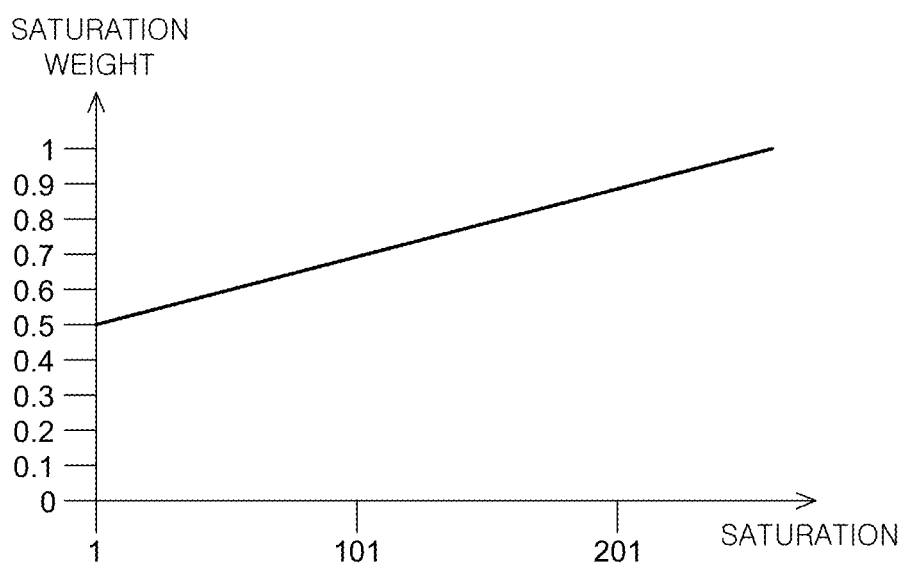
FIG. 4 is a graph illustrating a saturation and a saturation weight to be applied to a pixel for processing of of an input image by a saturation converting unit of the image processing unit shown in FIG. 2 according to an embodiment.
Figure 5:
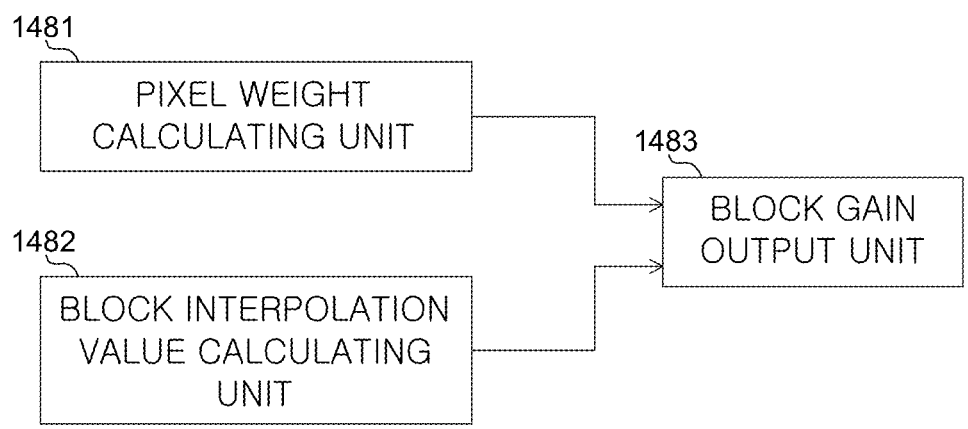
FIG. 5 is a block diagram schematically illustrating a configuration of a block gain calculating unit of the image processing unit shown in FIG. 2 according to an embodiment.

FIG. 2 is a block diagram schematically illustrating a configuration of an image processing unit 140 of the display device 100 shown in FIG. 1 according to an embodiment. FIG. 3 is a graph illustrating a luminance and a luminance weight which to be applied to a pixel for processing of an input image by the luminance converting unit 142 of the image processing unit 140 shown in FIG. 2 according to an embodiment. FIG. 4 is a graph illustrating a saturation and a saturation weight to be applied to a pixel for processing of an input image by the saturation converting unit 143 of the image processing unit 140 shown in FIG. 2 according to an embodiment. FIG. 5 is a block diagram schematically illustrating a configuration of a block gain calculating unit 148 of the image processing unit 140 shown in FIG. 2 according to an embodiment.

First, referring to FIG. 2, the image processing unit 140 according to an embodiment of the present disclosure includes an RGBW converting unit 141, a luminance converting unit 142, a saturation converting unit 143, a frame gain calculating unit 144, a pixel gain calculating unit 145, a final gain calculating unit 146, a color contrast ratio calculating unit 147, and a block gain calculating unit 148. In an embodiment, the RGBW converting unit 141, the luminance converting unit 142, and the saturation converting unit 143 of the image processing unit 140 use a three-color input image so that the RGBW conversion, luminance weight determination, and saturation weight determination may be simultaneously performed.

The RGBW converting unit 141 converts the three color image of red R, green G, and blue B (e.g., input from outside of the display device 100) into four-color image data R'G'B'W' based on a spectrum exchange method or another suitable method of conversion. Generally, white light generated in the white W sub pixel of the display device includes light of red R wavelength, light of green G wavelength, and light of blue B wavelength. Therefore, according to the spectrum exchange method, the RGBW converting unit 141 may reduce a light amount of the red R, green G, and blue B sub pixels by as much as a light amount of red R, green G, and blue B generated in the white W sub pixel.

In an embodiment, the RGBW converting unit 141 subtracts three color data (e.g., input to the sub pixels of red R, green G, and blue B) from the three-color input image RGB. Further, the RGBW converting unit 141 generates white data (e.g., supplied to the white W sub pixel) to convert the three-color input image RGB into four-color image data R'G'B'W'.

In an embodiment, the luminance converting unit 142 converts a luminance Y of a three-color input image of red R, green G, and blue B input from outside the display device 100 to map the luminance. When the luminance is mapped, a viewer of the display device 100 may easily perceive a difference in luminance of a part (e.g., an area) of a displayed image having a high luminance, and the viewer may perceive to a lesser degree a difference in luminance of a different part of the displayed image having a low luminance. In other words, the viewer may perceive differences in luminance with more sensitivity at higher lumaninces than at lower luminances. Therefore, a weight of an area having a high luminance is set to be high and a weight of an area having a low luminance is set to be low. As described above, an example relationship between the luminance and the luminance weight is illustrated in FIG. 3. More specifically, referring to the example graph of FIG. 3, since white corresponds to a color having a high luminance (for example, a part having a high luminance), a pixel representing white may have a luminance value of 255 (e.g., corresponding to a maximum value of 8-bit image data). Therefore, a luminance weight corresponding to the luminance value of 255 may be 1. As another example based on the example graph of FIG. 3, when a luminance value of a pixel representing yellow is 80, a luminance weight may be 0.3. The example graph of FIG. 3 illustrates that the luminance is proportional to the luminance weight, but the present disclosure is not limited thereto and may be modified according to a design. Further, in some embodiments, the initial value of the luminance weight Yweight is not set to be 0. When the luminance weight Yweight has a value in the range of 0 to 1, the initial value of the luminance weight may be set to be an intermediate value between 0 and 1, for example, 0.5. This is because when the initial value of the luminance weight Yweight is set to be 0, a luminance of an achromatic color adjacent to a chromatic color may be processed to be too dark and thus the display quality of the display device 100 may be deteriorated.

The saturation converting unit 143 converts a saturation of a three-color input image of red R, green G, and blue B input from outside the display device 100 to map the saturation. In an embodiment, the saturation may be calculated by dividing a minimum value of the three-color input image by an average value of the three-color input image. Therefore, responsive to the saturation converting unit 143 determining that the saturation is close to zero, the color is determined as a chromatic color (e.g., a color not mixed with black or white color) and responsive to determining that the saturation value is close to one, the color is determined as an achromatic color (e.g., a color mixed with black or white color). However, in some image processing or saturation mapping methods, a saturation value of 1 is mapped to be (e.g., associated with) a chromatic color and a saturation value of 0 is mapped to be (e.g., associated with) an achromatic color. Therefore, when the saturation of the input image is converted to be mapped, the saturation converting unit 143 may invert the color mappings. Further, as illustrated in FIG. 4, the saturation and the saturation weight Sweight may have a proportional relationship. That is, when a saturation of the pixel is high, a high saturation weight may be applied to the pixel, and when a saturation of the pixel is low, a low saturation weight may be applied to the pixel. The example graph of FIG. 4 illustrates that the saturation is proportional to the saturation weight, but the present disclosure is not limited thereto and may be modified according to a design. In some embodiments, an initial value of the saturation weight Sweight may be set to be an intermediate (e.g., non-zero) value rather than 0.

The frame gain calculating unit 144 calculates a frame gain of the sub pixels of red R, green G, blue B, and white W for the input image. In an embodiment, the frame gain calculating unit 144 equally multiplies each color sub pixel data in a corresponding frame of the input image by the calculated frame gain so that absolute luminance is changed without changing a color sense of the frame.

The pixel gain calculating unit 145 calculates a pixel gain for a pixel according to the saturation of the input image. Pixel gains may be different or the same for some or all pixels. In an embodiment, the pixel gain calculating unit 145 may calculate a saturation value by dividing the minimum of a three-color input image data by the average value of the three-color input image data. The pixel gain calculating unit 145 calculates a pixel gain according to a ratio of the saturation value. In some embodiments, the pixel gain calculating unit 145 calculates the pixel gain for every pixel according to the saturation so that pixels in the achromatic area and pixels in the chromatic area may have different pixel gains. For example, responsive to the pixel gain calculating unit 146 determining that red R data, green G data, and blue B data of 8 bit of pixel data are 250, 250, and 250, respectively, the pixel may be determined as a pixel in an achromatic area having no saturation. In this case, a saturation value of the pixel in the achromatic area is 1, and a saturation value of the pixel in the chromatic area is 0. That is, the pixel gain calculating unit 145 determines that as the saturation value becomes closer to 1, the pixel more represents an achromatic color, and as the saturation value becomes closer to 0, the pixel more represents a chromatic color. As described above, the pixel gains calculated by the pixel gain calculating unit 145 may have different values in the chromatic area and the achromatic area. Further, when the pixel gain for the input image is calculated, the pixel gain calculating unit 145 according to the embodiment of the present disclosure may consider a color contrast ratio in addition to the saturation. The color contrast ratio may be calculated using the final gain of the first frame of the input image.

The final gain calculating unit 146 adds the frame gain calculated by the frame gain calculating unit 144 and the pixel gain of a pixel calculated by the pixel gain calculating unit 145 to calculate a final gain of the pixel. Final gains may be different or the same for some or all pixels. Further, the final gain calculating unit 146 may use a block gain calculated using the final gain of the first frame of the input image to calculate a final gain of a second frame, e.g., that is subsequent to the first frame.

The color contrast ratio calculating unit 147 calculates a color contrast ratio using the final gain of the first frame of the input image calculated by the final gain calculating unit 146. In an embodiment, the color contrast ratio calculating unit 147 calculates an average of the final gains of the pixels of the first frame of the input image. The color contrast ratio calculating unit 147 calculates a difference of the calculated average of the final gains and the final gain of a pixel of the first frame to calculate the color contrast ratio of the pixel. Color contrast ratios may be different or the same for some or all pixels. In some embodiments, in the color contrast ratio, a difference between the final gain and the average of the final gains may be an absolute value.

The block gain calculating unit 148 may calculate the block gain using a pixel weight and a block interpolation value. The block gain calculating unit 148 may include a pixel weight calculating unit 1481, a block interpolation value calculating unit 1482, and a block gain output unit 1483 as illustrated in FIG. 5.

The pixel weight calculating unit 1481 multiplies the luminance weight Yweight output from the luminance converting unit 142 and the saturation weight Sweight output from the saturation converting unit 143 to calculate a pixel weight for a pixel. Since luminance or saturation values may vary between pixels, pixel weights may be different or the same for some or all pixels. In an embodiment, an image mapped by reflecting the luminance weight Yweight in the luminance converting unit 142 and an image mapped by reflecting the saturation weight Sweight in the saturation converting unit 143 are multiplied so that an image mapped by reflecting the pixel weight may be calculated.

In order to consider position information of pixels to which the input image is input, for example, to consider a distance between pixels, the block interpolation value calculating unit 1482 calculates a gain average of the blocks by virtually dividing the output frame image of the first frame of the input image into a plurality of blocks. As described above, when the first frame image is processed as the plurality of blocks, in order to avoid a boundary of blocks of the image from being recognized as a boundary when the user (e.g., a human viewer) perceives the image, the block interpolation value calculating unit 1482 may perform interpolation using an intermediate value of the blocks adjacent to a boundary area between blocks. For example, the block interpolation value calculating unit 1482 virtually divides both the chromatic area and the achromatic area into a plurality of blocks. In an example, a block average of the chromatic area is 1 and a block average of the achromatic is 0.5, so the block interpolation value calculating unit 1482 calculates the block interpolation value as 0.75, which is an intermediate value therebetween (e.g., an average value of the block averages). In some embodiments, the block interpolation calculating unit 1482 may be referred to as an average filter.

The block gain output unit 1483 may divide the pixel weight calculated in the pixel weight calculating unit 1481 by the block interpolation value calculated in the block interpolation value calculating unit 1482 to output a block gain of a pixel.

As described above, in the display device 100 according to an embodiment of the present disclosure, the output frame image of the first frame of the input image is divided into the plurality of blocks and the adjacent blocks are interpolated to suppress recognition of the boundary between the divided blocks. Therefore, a final gain to which the distance between pixels is reflected may be calculated.

Therefore, the image processing unit 140 of the display device 100 according to an embodiment of the present disclosure calculates the final gain using the luminance weight to which the luminance of the pixels of the input image is reflected and the block gain to which the distance between pixels is reflected and outputs the image to which the final gain is reflected. Therefore, a perception property (e.g., display quality such as sharpness) of the chromatic area in the output image displayed by the display device 100 may be improved.

Next, an image processing method of a display device 100 according to an embodiment of the present disclosure will be described in more detail with reference to FIG. 6.

Figure 6:
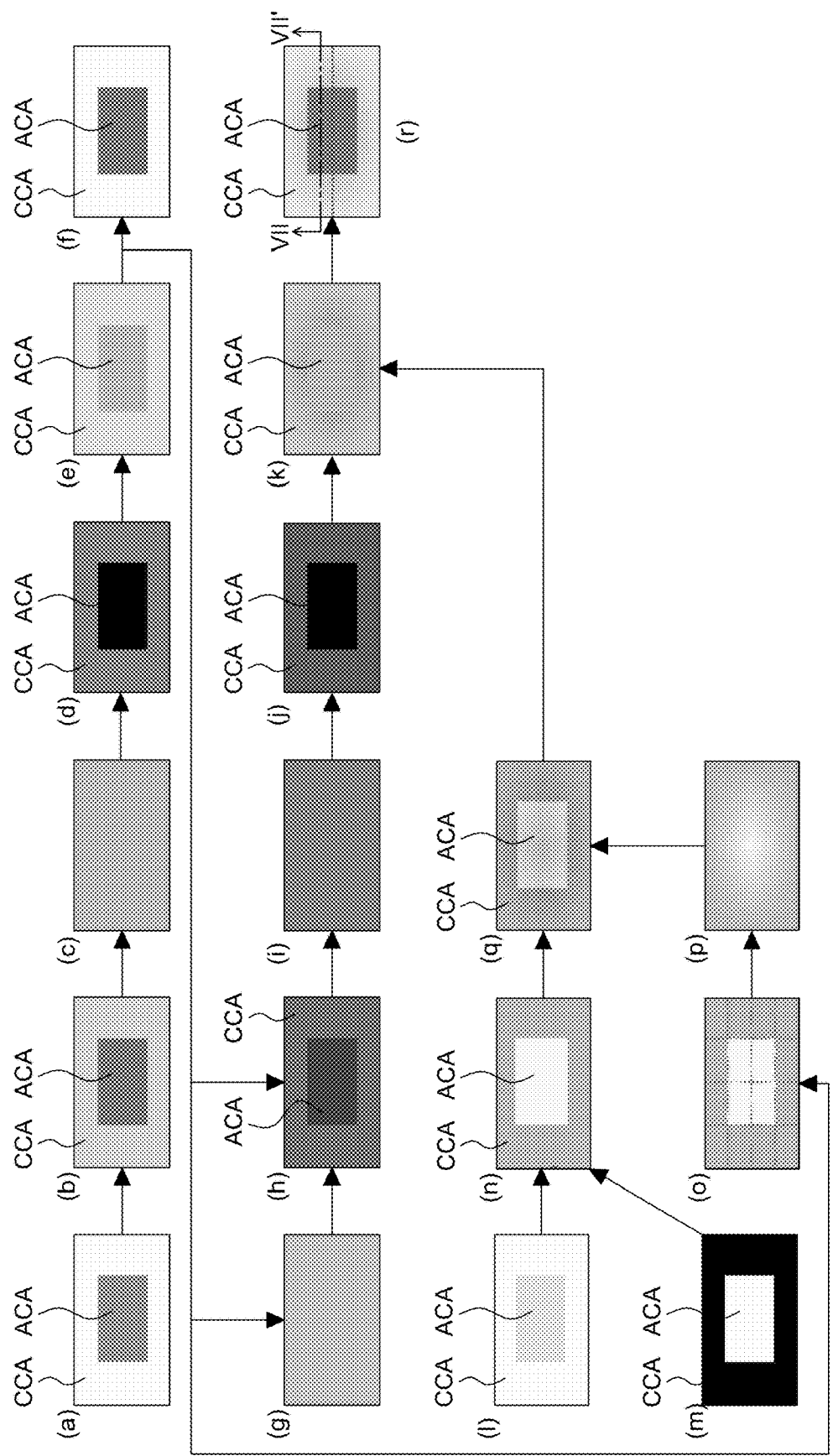
FIG. 6 is a diagram illustrating an example for explaining an image processing method of a display device according to an embodiment of the present disclosure.
Figure 7:
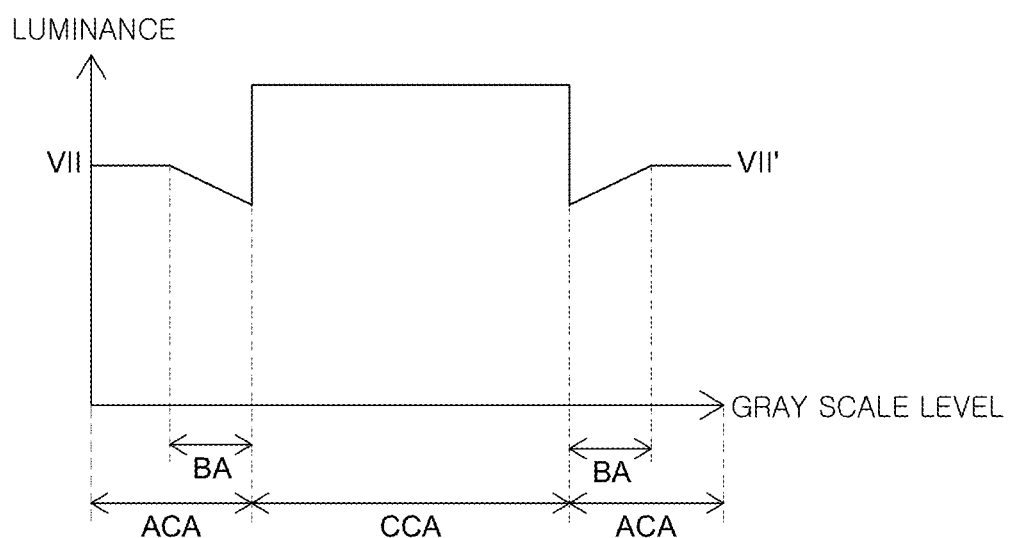
FIG. 7 is a graph illustrating luminance values of an image shown in FIG. 6 taken along the line VII-VII' according to an embodiment.

FIG. 6 is a diagram illustrating an example for explaining an image processing method of a display device 100 according to an embodiment of the present disclosure. FIG. 7 is a graph illustrating luminance values of an image shown in FIG. 6 according to an embodiment.

In the following example, the first frame of the input image and the output frame image denoted in FIGS. 1 to 5 are referred to as a first frame image and a first output frame image, respectively. Further, frame images input after the first frame image will be referred to as a second frame image, a third frame image, etc.

Referring to the example shown in FIG. 6, when a first frame image of an input image with three colors RGB having a chromatic area CCA and an achromatic area ACA as illustrated in (a) is input from outside the display device 100 to the image processing unit 140, the RGBW converting unit 141 converts the first frame image into a first frame image with four colors R'G'B'W' as shown in (b).

The frame gain calculating unit 144 multiplies the sub pixels of four colors to which the first frame image is input as shown in (c) and a predetermined set value to calculate a frame gain. In an embodiment, all sub pixels of the four colors are multiplied by the same set value so that the chromatic area CCA and the achromatic area ACA may have the same frame gain. In this embodiment, for the convenience of the following description and understanding, it is assumed that the frame gain has a value of 1, for example.

The pixel gain calculating unit 145, as in shown (d), calculates a pixel gain of the sub pixels of the four colors to which the first frame image is input. As described above, the pixel gain is calculated according to the saturation. Therefore, the pixel gain of the chromatic area CCA and the pixel gain of the achromatic area ACA may have different values. For example, the pixel gain of the chromatic area CCA of the first frame image may be 0 and the pixel gain of the achromatic area ACA may be 0.5.

The final gain calculating unit 146, as shown in (e), calculates a final gain of the chromatic area CCA and a final gain of the achromatic area ACA using the frame gain and the pixel gain. As described above, the final gain may be calculated by adding the frame gain and the pixel gain of a pixel. For example, in the above-described example, the frame gain is 1, the pixel gain of the chromatic area CCA is 0, and the pixel gain of the achromatic area ACA is 0.5 so the final gain calculating unit 146 calculates the final gain of the chromatic area CCA to be 1 (e.g., 1+0) and the final gain of the achromatic area ACA to be 1.5 (e.g., 1+0.5).

As described above, the image processing unit 140 applies the calculated final gain to the first frame image to output a first output frame image as shown in (f).

The color contrast ratio calculating unit 147 may calculate an average of the final gains of the pixels of the first output frame image as shown in (g). For example, the final gain value of the first output frame image is 1 in the chromatic area CCA and 1.5 in the achromatic area ACA, so the color contrast ratio calculating unit 147 calculates the average of the final gains of the first output frame image to be 1.125.

The color contrast ratio calculating unit 147 calculates a difference between the final gains of the pixels of the first output frame image and the final gain average of the first output frame image as shown in (h). For example, since the final gain value of the first output frame image is 1 in the chromatic area CCA and the final gain average is 1.125, the color contrast ratio calculating unit 147 calculates the difference of the final gain value and the final gain average in the chromatic area CCA as 0.125. Further, in the achromatic area ACA, the final gain value is 1.5 and the final gain average is 1.125, so the color contrast ratio calculating unit 147 calculates the difference between the final gain value and the final gain average in the achromatic area ACA as 0.375.

The color contrast ratio calculating unit 147 calculates a color contrast ratio of the chromatic area CCA and the achromatic area ACA as shown in (i). The color contrast ratio calculating unit 147 may be calculated by adding a difference between the final gain and the final gain average in the chromatic area CCA of the first output frame image and a difference between the final gain and the final gain average in the achromatic area ACA. For example, the difference between the final gain and the final gain average in the chromatic area CCA of the first output frame image is 0.125 and the difference between the final gain and the final gain average in the achromatic area ACA is 0.375, so the color contrast ratio calculating unit 147 calculates the color contrast ratio to be 0.5.

The pixel gain calculating unit 145 calculates the pixel gain of the sub pixels to which a second frame image which will be input after the first frame image is input based on the color contrast ratio to the pixel gain of the first frame image, as shown in (j). For example, the pixel gains to which the first frame image is input is 0 in the chromatic area CCA and 0.5 in the achromatic area ACA, so the pixel gain calculating unit 145 calculates (e.g., by multiplying a color contrast ratio by a pixel gain) a pixel gain values of a sub pixel of the second frame image (e.g., to which the color contrast ratio is reflected based thereon) to be 0 in the chromatic area CCA and 0.25 in the achromatic area ACA.

When the final gain value of the second frame image is calculated by the final gain calculating unit 146, a block gain may be calculated using the first output frame image. A process of calculating the final gain value of the second frame image is shown in steps (l) to (q), which will be described below.

As shown in (l), the luminance converting unit 142 converts the luminance of the first frame image to determine a luminance weight Yweight (e.g., scaled versions of luminance values) of each pixel and map a first frame image to which the luminance weight is reflected. The saturation converting unit 143, as shown in (m), converts the saturation of the first frame image to determine a saturation weight Sweight (e.g., scaled versions of saturation values) of each pixel and reflect the saturation weight to map a first frame image.

The pixel weight calculating unit 1481 of the block gain calculating unit 148 multiplies the luminance weight Yweight and the saturation weight Sweight determined in steps (l) and (m) to calculate the pixel weight of each pixel of the image as shown in step (n). In an embodiment, the pixel weight calculating unit 1481 multiplies a a first image for the first frame image including the scaled versions of luminance values and a second image for the first frame image including the scaled versions of saturation values to obtain a third image of the first frame image including the pixel weights.

The block interpolation value calculating unit 1482, as shown in (o), virtually divides the chromatic area CCA and the achromatic area ACA of the first output frame image, output from step (f), into a plurality of blocks. In order to suppress the boundary area of the chromatic area CCA and the achromatic area ACA from being recognized as a boundary, the block interpolation value calculating unit 1482, as shown in (p), performs interpolation to output a block-processed image and calculate block interpolation values. For example, as shown in step (p), the boundaries of the blocks have been diffused in comparison to the boundaries shown in step (o).

The block gain output unit 1483 calculates and outputs the block gain as shown in (q) using the block interpolation values calculated in step (p) and the pixel weight calculated in step (n). In some embodiments, the block gain of a pixel may be calculated by the block gain calculating unit 148 by dividing the pixel weight by the block interpolation value of the pixel. As described above, when the block gain calculating unit 148 calculates the block gain, a difference between the block gain of the chromatic area CCA and the block gain of the achromatic area ACA may be large in an area adjacent to the boundary of the chromatic area CCA and the achromatic area ACA. However, the block gain of the chromatic area CCA may be close to the block gain of the achromatic area ACA in an area far from the boundary (e.g., toward a border of the image). Therefore, for the boundary of the chromatic area CCA and the achromatic area ACA, more specifically, in an area of the achromatic area ACA adjacent to the chromatic area CCA, the block gain calculating unit 148 may calculate a final gain that is low so that the luminance at the boundary may be dark. This is because by dividing the first output frame image into the plurality of blocks, the boundary is interpolated.

The final gain calculating unit 146 may multiply the pixel gain value of the second frame image calculated in step (j) and the block gain value calculated in step (q) to calculate the final gain value of the second frame image as shown in step (k). In an embodiment, even though not illustrated in FIG. 6, similarly to the first frame image, as illustrated in steps (a) to (c) of FIG. 6, when the second frame image is input, a step of converting the second frame image into a four-color second frame image and calculating a frame gain value of the second frame image is included. Therefore, when the final gain value of the second frame image is calculated, the frame gain of the second frame image is also considered to calculate the final gain.

The image processing unit 140 outputs the second frame image to which the second final gain is reflected as shown in step (r).

As seen from the graph of luminance values of the image output in step (r), as illustrated in FIG. 7, it is understood that the luminance is lowered in the boundary areas BA by lowering the gain values of the pixels located in the boundary areas BA of the achromatic areas ACA adjacent to the chromatic area CCA.

The image processing method of a display device 100 according to an embodiment of the present disclosure performs interpolation by dividing the first frame image into the plurality of blocks and reflecting the block gain to which the luminance and the saturation of the first frame image are reflected to calculate the final gain. Therefore, the final gain value of the achromatic area ACA adjacent to the chromatic area CCA is lowered to improve a color sense of the chromatic area CCA.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical spirit of the present disclosure. The scope of the technical spirit of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
   a display panel including a plurality of pixels formed of red, green, blue, and white sub pixels;
   an image processing unit for converting a three-color input image supplied to the red, green, blue, and white sub pixels into four-color image data and for outputting an output image by applying a final gain calculated using a frame gain, a pixel gain, and a block gain of pixels of the three-color input image; and
   a timing controller for outputting the output image from the image processing unit to the display panel,
   wherein the block gain is calculated using (i) scaled versions of luminance values of the three-color input image and (ii) a position information of the pixels of the three-color input image.

2. The display device according to claim 1, wherein the image processing unit processes a first frame image and a second frame image of the three-color input image to output a first output frame image and a second output frame image and calculates the pixel gain and the block gain using the first output frame image.

3. The display device according to claim 2, wherein the block gain is calculated using a pixel weight and a block interpolation value, the pixel weight calculated by multiplying the scaled versions of luminance values and scaled versions of saturation values, the scaled versions of saturation values determined by converting a saturation of the three-color input image, the block interpolation value determined by dividing the first output frame image into a plurality of blocks to reflect position information of the plurality of pixels and interpolating the plurality of blocks with an intermediate value of a plurality of block values.

4. The display device according to claim 3, wherein the image processing unit includes:
   a RGBW converting unit for converting the first frame image and the second frame image into a four-color first frame image and a four-color second frame image, respectively;
   a luminance converting unit for converting luminance of the first frame image to determine the scaled versions of luminance values;
   a saturation converting unit converting saturation of the first frame image to determine the scaled versions of saturation values;
   a frame gain calculating unit for calculating a first frame gain and a second frame gain of the pixels of the three-color input image for the first frame image and the second frame image, respectively;
   a pixel gain calculating unit for calculating a first pixel gain and a second pixel gain of the pixels of the three-color input image for the first frame image and the second frame image, respectively;
   a block gain calculating unit for calculating a block gain using the scaled versions of luminance values and the scaled versions of saturation values;
   a final gain calculating unit for calculating a first final gain of the first frame image using the first frame gain and the first pixel gain and calculating a second final gain of the second frame image using the second frame gain, the second pixel gain, and the block gain; and
   a color contrast ratio calculating unit for calculating a color contrast ratio using the first final gain.

5. The display device according to claim 4, wherein the pixel gain calculating unit calculates the first pixel gain of the first frame image according to the scaled versions of saturation values, a first pixel gain value of 0 corresponding to first pixels of a chromatic area of the first frame image, and a second pixel gain value between 0.1 and 1 corresponding to second pixels of an achromatic area of the first frame image.

6. The display device according to claim 4, wherein the color contrast ratio calculating unit calculates the color contrast ratio by calculating:
   an average of first final gains of the of pixels of the three-color input image,
   a first difference between a first final gain of a first pixel of a chromatic area of the first frame image and the average of first final gains,
   a second difference between a second final gain of a second pixel of an achromatic area of the first frame image and the average of first final gains, and
   a sum of the first difference and the second difference.

7. The display device of claim 6, wherein the pixel gain calculating unit calculates the second pixel gain for the second frame image using the color contrast ratio and the first pixel gain.

8. The display device according to claim 4, wherein the block gain calculating unit includes:
   a pixel weight calculating unit for calculating the pixel weight using the scaled versions of luminance values and the scaled versions of saturation values;
   a block interpolation value calculating unit for dividing the first output frame image into the plurality of blocks and calculating the block interpolation value by interpolating the divided first output frame image; and
   a block gain output unit for outputting the block gain by dividing the pixel weight by the block interpolation value.

9. The display according to claim 8, wherein the block interpolation value calculating unit (i) calculates a first block average of a chromatic area of the first frame image and a second block average of an achromatic area of the first frame image and (ii) interpolates a boundary area of the chromatic area and the achromatic area with an intermediate value to calculate the block interpolation value, the intermediate value calculated using an average of the first block average and the second block average.

10. The display device according to claim 9, wherein initial values of the scaled versions of luminance values and the scaled versions of saturation values are set to be intermediate values in a range of weights.

11. The display device according to claim 1, wherein the image processing unit lowers gains of the pixels of the three-color input image representing a boundary of an achromatic color area of the three-color input image and a chromatic color area of the three-color input image.

12. An image processing method comprising:
   determining gain values of pixels of an input image, the gain values including first gain values for a first portion of the input image having a first average saturation value and second gain values for a second portion of the input image having a second average saturation value;
   determining a color contrast ratio by combining the first gain values and the second gain values;

modifying a subset of the gain values corresponding to pixels at a boundary between the first portion and the second portion; and generating an output image by processing another input image subsequent to the input image using the color contrast ratio and the modified subset of gain values.

13. The image processing method according to claim 12, further comprising:

determining an average of the gain values;

determining a first difference between one of the first gain values and the average of the gain values; and determining a second difference between one of the second gain values and the average of the gain values, the color contrast ratio determined by adding the first difference and the second difference.

14. The image processing method according to claim 12, wherein modifying the subset of the gain values corresponding to pixels at the boundary between the first portion and the second portion comprises:

performing interpolation on the subset of gain values using the first gain values and the second gain values such that luminance values of pixels of the output image corresponding to the boundary are less than other luminance values of other pixels of the output image.

15. The image processing method according to claim 14, further comprising:

determining a first image including scaled versions of luminance values of the input image;

determining a second image including scaled versions of saturation values of the input image;

determining pixel weights of the pixels of the input image by multiplying the first image with the second image;

determining block interpolation values by performing the interpolation on the subset of gain values; and determining block gain values by dividing the pixel weights by the block interpolation values, the gain values including the block gain values.

16. The image processing method according to claim 15, wherein the scaled versions of luminance values and the scaled versions of saturation values do not include zero values.

17. The image processing method according to claim 12, wherein the first portion of the input image corresponds to a chromatic area and the second portion of the input image corresponds to an achromatic area, the first average saturation value less than the second average saturation value.

18. A display device, comprising:

a display panel including a plurality of red, green, blue, and white sub pixels; and an image processing unit configured to:

determine gain values of pixels of an input image, the gain values including first gain values for a first portion of the input image having a first average saturation value and second gain values for a second portion of the input image having a second average saturation value;

determine a color contrast ratio by combining the first gain values and second gain values;

modify a subset of the gain values corresponding to pixels at a boundary between the first portion and the second portion; and generate an output image by processing another input image subsequent to the input image using the color contrast ratio and the modified subset of gain values for display on the display panel.

19. The display device of claim 18, wherein the image processing unit is further configured to:

determine an average of the gain values;

determine a first difference between one of the first gain values and the average of the gain values; and determine a second difference between one of the second gain values and the average of the gain values, the color contrast ratio determined by adding the first difference and the second difference.

20. The display device of claim 18, wherein the subset of the gain values corresponding to pixels at the boundary between the first portion and the second portion is modified by:

performing interpolation on the subset of gain values using the first gain values and the second gain values such that luminance values of pixels of the output image corresponding to the boundary are less than other luminance values of other pixels of the output image.

21. The display device of claim 20, wherein the image processing unit is further configured to:

determine a first image including scaled versions of luminance values of the input image;

determine a second image including scaled versions of saturation values of the input image;

determine pixel weights of the pixels of the input image by multiplying the first image with the second image;

determine block interpolation values by performing the interpolation on the subset of gain values; and determine block gain values by dividing the pixel weights by the block interpolation values, the gain values including the block gain values.

22. The display device of claim 21, wherein the scaled versions of luminance values and the scaled versions of saturation values do not include zero values.

23. The display device of claim 18, wherein the first portion of the input image corresponds to a chromatic area and the second portion of the input image corresponds to an achromatic area, the first average saturation value less than the second average saturation value.

* * * * *